United States Patent [19]

Rieper

[11] Patent Number: 5,086,168

[45] Date of Patent: Feb. 4, 1992

[54] MONOAZO PIGMENTS DERIVED FROM DIAZOTIZED DI- OR TRICHLOROANILINES, PREPARATION THEREOF AND THERE USE

[75] Inventor: Wolfgang Rieper, Frankfurt am Main, Fed. Rep. of Germany

[73] Assignee: Hoechst Aktiengesellschaft, Frankfurt, Fed. Rep. of Germany

[21] Appl. No.: 578,014

[22] Filed: Sep. 5, 1990

Related U.S. Application Data

[63] Continuation of Ser. No. 474,982, Feb. 6, 1990, abandoned, which is a continuation of Ser. No. 278,199, Nov. 30, 1988, abandoned.

[30] Foreign Application Priority Data

Dec. 1, 1987 [DE] Fed. Rep. of Germany ....... 3740622

[51] Int. Cl.$^5$ .................. C09B 29/20; C09B 29/32; C09B 41/00; D06P 1/44
[52] U.S. Cl. .................... 534/579; 534/581; 534/582; 534/583; 534/584; 534/863; 534/864; 534/874; 534/887; 534/739; 8/637.1; 106/23
[58] Field of Search ............... 534/579, 581, 582, 583, 534/584, 639, 641, 863, 864, 874, 887, 739; 8/637.1

[56] References Cited

U.S. PATENT DOCUMENTS

| | | | |
|---|---|---|---|
| 3,124,565 | 3/1964 | Schilling et al. | 534/583 X |
| 4,195,020 | 3/1980 | Hunger et al. | 534/575 X |
| 4,395,264 | 7/1983 | Fenwick | 534/582 X |
| 4,459,233 | 7/1984 | Fabian et al. | 540/140 |

FOREIGN PATENT DOCUMENTS 58-132046 8/1983 Japan .................... 534/739

OTHER PUBLICATIONS

Anliker et al., Swiss Chem. J., 3, 17-23 (in German), 25-29 (in English) (1981).
Herbst et al., *Industrielle Organische Pigmente*, VCH--Verlag, Weinheim, 1987, pp. 577-578.
Bankman et al. I, *J. Soc. Dyers & Colorists* 100, 118-123 (1984).
Bankman et al. II, Chemosphere, 13, pp. 449-506 (1984).
B.I.O.S. Report 1661, pp. 128-129, Ed. by F. A. Walker et al. (1976).
Martinetz, Dieter, *Chem. Techn.* 39, 466-470 (1987).

*Primary Examiner*—David B. Springer
*Assistant Examiner*—Fiona Powers

[57] ABSTRACT

The invention relates to monoazo pigments prepared from dichloroanilines as diazo components and CH-acidic coupling components of the acetoacetarylamide or naphthol series, these pigments only containing an extremely low level of polychlorinated biphenyls (PCBs) (at most 25 µg per g of pigment).

The process for preparing the pigments takes the form of an azo coupling in an aqueous medium, wherein
a) azo coupling is effected by adding the diazonium salt solution to a suspension or solution of the coupling component or by simultaneously metering the aqueous suspensions or solutions of the diazonium salt and of the coupling component into the reaction mixture,
b) azo coupling is effected at a pH or within a pH range of less than pH 7 and
   b1) between pH 4 and 7 during and after azo coupling less than 0.05 mol-%,
   b2) at pH 2 to 4 during azo coupling less than 5 mol-%, and
   b3) at pH < 2 during azo coupling less than 25 mol-%, of diazonium salt is detectable in the reaction mixture and in pH ranges b2) and b3) more than 0.05 mol-% of diazonium salt is not present for longer than a total of 8 hours, more than 5 mol-% diazonium salt is not present for longer than a total of 4 hours and more than 15 mol-% of diazonium salt is not present for longer than a total of 2 hours, the mol-% ages of diazonium salt each being based on the total number of moles of coupling component present in the reaction mixture and pigment already formed,
c) azo coupling is effected at a temperature or temperatures of 0° to 50° C., preferably 20° to 40° C.,
d) azo coupling is effected in the absence of nitrite ions, and
e) azo coupling is carried out in the absence or presence of coupling assistants or coupling accelerants.

The monoazo pigments, like existing monoazo pigments of corresponding structures, are useful for coloring natural and synthetic materials.

16 Claims, No Drawings

MONOAZO PIGMENTS DERIVED FROM DIAZOTIZED DI- OR TRICHLOROANILINES, PREPARATION THEREOF AND THERE USE

This application is a continuation of copending application Ser. No. 07/474,982, filed on Feb. 6, 1990, now abandoned, which in turn is a continuation of application Ser. No. 07/278,199, filed on Nov. 30, 1988, now abandoned.

DESCRIPTION

The invention relates to monoazo pigments which are prepared from dichlorobenzenediazonium salts and CH-acidic coupling components of the acetoacetarylamide or naphthol series and contain only extremely low amounts of polychlorinated biphenyls (PCBs).

It is known that, owing to their method of synthesis, any organic solvents used in the course of that synthesis or because of certain structural features of the starting components, industrially produced organic pigments can contain polychlorinated biphenyls (PCBs) (see R. Anliker, Swiss Chem. 3 (1981), 17–23 (German) or 25–29 (English); W. Herbst and K. Hunger in "Industrielle Organische Pigmente", VCH-Verlag, Weinheim 1987, pp. 577–578). To detect these impurities in pigments, the dyestuffs manufacturing industry was instrumental in the form of ETAD in developing and recommending specific methods of analysis (Bankmann et al., J. Soc. Dyers & Colourists 100 (1984) 118–123; Bankmann et al., Chemosphere 13 (1984) 499–506). Not so much the toxicity or the carcinogenic potential but in particular the persistence and bioaccumulative properties of polychlorinated biphenyls are responsible for the fact that not only the production of this class of compounds, which were formerly widely used in industry, has ceased completely but also that the distribution of products and formulations containing PCBs as impurities has come under restrictions and controls. Legislation in this area has been tightened up in recent years, and the limits on permissible polychlorinated biphenyls in commercial products have been drastically reduced. The limit has been fixed for example in the USA to a maximum of 25 mg of PCB averaged over a year per kg of substance made commercially available. It has now been found that in particular monoazo pigments based on di- or trichloroanilines as diazo components are obtained in the course of their preparation by the previously practiced industrial coupling processes with PCB contents of distinctly more than 25 μg/g.

The literature describes numerous methods for substantially freeing contaminated liquids or solids from polychlorinated biphenyls. In these methods, the PCB content is either removed by solvent extraction or degraded (inertized) by modifying the chemical structure of the polychlorinated biphenyls.

The latter group of methods includes methods of dehalogenation, for example with alkali metals, alkali metal hydroxides, alkali metal compounds of polyalkylene glycol ethers or else methods with sulfur, as well as methods of catalyzed oxidative degradation or degradation by supplying thermal, photolytic or electric energy. Since polychlorinated biphenyls, however, are markedly unreactive organic compounds, it is in general unavoidable that the lastmentioned aggressive methods of purification also inflict damage on the organic pigments to be purified, so that these methods are unsuitable in practice for any subsequent purification of pigments.

However, the abovementioned methods of purification by solvent treatment could, in selected cases, also be applied to organic pigments. For instance, EP-B-0,063,321 (U.S. Pat. No. 4,459,233 to Fabian et al, issued July 10, 1984) states that crude organic pigments can be converted into products of high purity by treatment at 50° to 180° C. with a mixture of a hydrophilic and a hydrophobic organic solvent, these solvents only having limited mutual miscibility. In the course of this treatment, the impurities accumulate in one of the organic phases. This and similar methods of purification are suitable in some instances for pigments of very good solvent fastness and for pigments where the solvent treatment frequently can bring about in addition an improvement in the application properties of the crude pigment obtained in the synthesis. Admittedly, the solvent treatment usually does not get rid of all the pigment impurities, for example PCB, since these impurities on the one hand are bonded adsorptively to the surfaces of the pigment particles and on the other are enclosed in agglomerates. The solvent treatment is in any case not very suitable for pigments of comparatively low solvent resistance, such as, for example, monoazo pigments having a simple structure. After synthesis these pigments are already present in a form which possesses the desired application properties. Any after-treatment with organic solvents usually has an undesirable effect on the physical properties of monoazo pigments and their coloristic properties as well. A further problem is the fact that, in all methods of purification involving organic solvents, it is necessary, in the recovery thereof, that the impurities accumulated therein be removed and destroyed. Especially the latter is—as previously explained—associated with major expense in the case of PCBs.

On account of the problems mentioned, it is particularly desirable to prepare monoazo pigments which, from the synthesis, already have a sufficiently low PCB content as to require no subsequent purification.

The present invention provides monoazo pigments of the general formula (I)

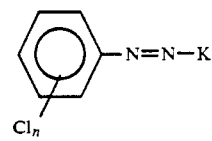

where K is the radical of an CH-acidic coupling component of the acetoacetarylamide or naphthol series and n is 2, which contain not more than 25 μg of polychlorinated biphenyls having at least 4 chlorine atoms (PCBs) per g of pigment, determined by first dissolving the pigment in concentrated sulfuric acid, then transferring the PCB portions into an apolar organic solvent, and analyzing therein for PCB in a conventional manner.

For the quantitative detection of PCB impurities, including the portions bound occlusively and adsorptively to the pigment, a sample of the pigment to be analyzed is dissolved in concentrated sulfuric acid, and the chlorinated biphenyls are then transferred in a combined extraction/purification procedure (for example by chromatography) into an apolar solvent such as aliphatic hydrocarbons, particularly n-hexane. In the organic solution obtained, the PCB content is then determined quantitatively in a conventional manner, for example by gas chromatography, as recited in detail for example at the end of Example 1.

The present invention also provides a process for preparing the monoazo pigments of the formula (I) according to the invention by azo coupling a dichlorobenzenediazonium salt or a mixture of a plurality of such diazonium salts with at least one CH-acidic coupling component H-K of the acetoacetarylamide or naphthol series in an aqueous medium, wherein a) azo coupling is effected by adding the diazonium salt solution to a suspension or solution of the coupling component or by simultaneously metering the aqueous suspensions or solutions of the diazonium salt and of the coupling component into the reaction mixture, b) azo coupling is effected at a pH or within a pH range of less than pH 7 and
  b1) between pH 4 and 7 during and after azo coupling less than 0.05 mol-%, preferably less than 0.02 mol-%,
  b2) at pH 2 to 4 during azo coupling less than 5 mol-%, preferably less than 0.05 mol-%, and
  b3) at pH<2 during azo coupling less than 25 mol-%, preferably less than 5 mol-% of diazonium salt is detectable in the reaction mixture and in pH ranges b2) and b3) more than 0.05 mol-% of diazonium salt is not present for longer than a total of 8 hours, more than 5 mol-% diazonium salt is not present for longer than a total of 4 hours and more than 15 mol-% of diazonium salt is not present for longer than a total of 2 hours, the mol-%ages of diazonium salt each being based on the total number of moles of coupling component present in the reaction mixture and pigment already formed, c) azo coupling is effected at a temperature or temperatures of 0° to 50° C., preferably 20° to 40° C., d) azo coupling is effected in the absence of nitrite ions, and e) azo coupling is carried out in the absence or presence of coupling assistants or coupling accelerants.

The process according to the invention makes it possible to prepare monoazo pigments which, compared with the corresponding monoazo pigments prepared in a conventional manner, are obtained from the synthesis with an appreciably reduced level of PCB. The PCB content of pigments prepared according to the invention is at most 25 μg per g of pigment.

Suitable diazo components for the process according to the invention are for example 2,3-dichloroaniline, 2,4-dichloroaniline, 2,5-dichloroaniline, 2,6-dichloroaniline, 3,4-dichloroaniline, 3,5-dichloroaniline, of which 2,4- and 2,5-dichloroaniline are preferred diazo components.

Suitable coupling components for the process according to the invention are CH-acidic compounds of the acetoacetarylamide or naphthol series. Particularly interesting coupling components are acetoacetarylamides, such as acetoacetanilide which may be substituted on the phenyl ring by one or more, preferably 1 to 3, of the radicals methyl, methoxy, ethoxy, nitro and chlorine and may have on the phenyl ring a fused-on 5- or 6-membered heterocycle, and also naphthol or naphthol derivatives, such as 2-hydroxy-3-naphthoic acid and 2-hydroxy-3-N-arylnaphthamides, for example 2-hydroxy-3-N-phenylnaphthanilide which may be substituted on the phenyl ring by one or more of the radicals methyl, methoxy, ethoxy, nitro, alkanoylamino, such as acetamino, aroylamino, such as benzoylamino, and chlorine and may have on the phenyl ring a fused-on 5- or 6-membered heterocycle.

Preferred coupling components are 5-acetoacetylaminobenzimidazolones or in particular 2-hydroxy-3-N-arylnaphthamides, such as 2-hydroxy-3-naphthanilide, 2-hydroxy-3-N-(2- or 4-methylphenyl)-naphthamide, 2-hydroxy-3-N-(2-methoxyphenyl or -2-ethoxyphenyl)-naphthamide, 2-hydroxy-3-N-(2,5-dimethoxyphenyl)naphthamide and 5-(2-hydroxy-3-naphthoylamino)-benzimidazol-2-one.

Coupling of the diazo component with the coupling component is effected at 0° to 50° C., preferably 20° to 40° C., in the absence of nitrite ions, preferably while avoiding a temperature at which a very low rate of reaction is present and reaction times of more than 8 hours are required. Azo coupling is carried out at a pH below 7 and can be effected not only in a buffered system within a very narrow pH range or substantially without buffering within a wide pH range. In a preferred version of the process, an aqueous mineral acid solution of the diazonium salt is added dropwise or in a continuous stream to the aqueous suspension of the finely divided coupling component within the pH range between 4 and 7, preferably at 4.5 to 6, in the presence or absence of coupling-accelerating assistants, the rate of addition of the diazonium salt solution being controlled in such a way that the amount of detectable diazonium salt in the reaction mixture is less than 0.05 mol-%, preferably less than 0.02 mol-%, based on the total number of moles of coupling component present in the reaction mixture and the pigment already formed.

The absence of diazonium ions or their small temporary excess within the range of the stated detection limits is monitored and checked in the course of the coupling by frequent spot tests with suitable couplers, for example H-acid or N-(1-naphthyl)-ethylenediamine, or by electrochemical methods of measurement, for example potentiometric measurements, or by optical methods of measurement, for example reflectance measurement on the pigment suspension, it also being possible for the control of the addition of the diazonium salt solution to be effected automatically.

The stated pH limits are maintained in the preferred process by means of suitable buffer systems, these buffer systems preferably already being formed in the course of the preparation of the suspension of the coupling component.

To maintain the above-described pH range, the frequently practiced continuous or discontinuous addition of aqueous base solutions, such as, for example, dilute aqueous sodium hydroxide solution, must not be employed, since with this form of addition high local concentrations of added base are inevitable, in particular within the area of the point of entry. The local excess of bases is inter alia also a reason for excluding the version of coupling where the alkaline solution of the coupling component is added to the previously introduced diazonium salt solution and a local excess of alkali in the reaction zone of diazonium ions can hardly be avoided.

Toward the end of the azo coupling care must be taken to ensure not to add an unchecked excess of diazonium salt. Similarly, it is necessary to avoid a large excess of total coupling component employed because a consequence is otherwise a high proportion of unconverted coupling component as an impurity in the isolated pigment. Preferably, azo coupling is carried out with an excess of coupling component of not more than 5 mol-% per mole of pigment.

Azo coupling can be carried out in another preferred version of the process with less buffering, in which case the reaction then starts in general at a pH of 7 to 5 but in the course of time, as a consequence of the addition of mineral acid diazonium salt solution, however, drops below pH 4. In the range below pH 4, in particular below pH 3, the rate of reaction is much reduced compared with the rate of reaction at higher pH. It is therefore advisable to carry out the reaction in the presence of coupling-accelerating assistants, in particular surfactants, preferably ionic surfactants. Nevertheless, in the pH range below pH 4 the reduced reactivity of the coupling component makes it difficult to carry out the reaction without a temporary excess of diazonium salt. On the other hand, the rate of PCB formation likewise decreases with decreasing pH, and larger amounts of diazonium salt can be tolerated in the reaction mixture. According to the invention, the addition of diazonium salt solution during azo coupling is controlled in such a way that at a pH of 2 to 4 a temporary excess of less than 5 mol-%, preferably less than 0.05 mol-%, of diazonium salt and at a pH<2 a temporary excess of less than 25 mol-%, preferably less than 5 mol-%, exists, the mol-%ages being based on the total number of moles of coupling component present in the reaction mixture and the pigment already formed, and an amount of more than 5 mol-% of diazonium salt is not maintained for longer than 4 hours, preferably not for longer than 2 hours.

It is possible in the process according to the invention for the amount of diazonium salt toward the end of the maximum time limit still to be above the stated limits. This can happen in particular when the amount of coupling component used has not as yet all reacted or when an excess of diazonium salt, based on the stoichiometry of the coupling reaction, was used. In these cases, the reaction batch is worked up without delay in order to prevent further PCB formation which is favored by elevated amounts of free diazonium salt under coupling conditions.

In another version of the process according to the invention, azo coupling is carried out entirely at below pH 4.

The most suitable rate of addition of the diazonium salt solution and the most suitable temperature for the azo coupling reaction can be determined in a factorially designed experiment.

To raise the rate of reaction of couplings in the acid medium, in particular within the pH range below 3, it has proved advantageous to add surface-active compounds, preferably ionic surfactants, i.e. anionic or cationic surfactants.

Suitable anionic surfactants are for example primary fatty alcohol sulfates or ether sulfates, alkylsulfonates, alkylsulfonamidocarboxylic acids, acylaminocarboxylic acids, fatty acid condensation products, such as fatty acid taurides, and also alkylarylsulfonates and alkylaryl ether sulfates, in particular sulfosuccinic esters of ethoxylated nonylphenol novolaks.

Suitable cationic surfactants are for example tertiary amines, which may also carry terminal free amino groups, or quaternary ammonium salts.

The azo couplings and the precipitation of coupling components can incidentally be carried out in the presence of additional customary assistants, in particular ionic surfactants.

Azo pigments can be prepared according to the invention in customary apparatus. However, it has proved to be particularly favorable to carry out the azo coupling in a static or dynamic mixer as reactor, in which case the solutions of the diazonium salt and of the coupling component are metered in simultaneously or the solution of the diazonium salt impinges in the reactor on a suspension of the coupling component precipitated immediately before entry into the reactor. Following a short residence time in the mixer of the order of less than 1 second to a few minutes, the coupling batch is discharged as a pigment suspension which is further processed in a conventional manner. The aqueous pigment suspensions obtained are in general filtered after synthesis and the pigments washed until salt-free. The aqueous press cake obtained is either used directly for pigmenting or, after drying, first processed into a powder.

Since the pigments prepared according to the invention contain not more than 25 µg of polychlorinated biphenyls per g of pigment, they are not in need of additional purification for the removal of PCB, but can be used directly in those application areas where such a low PCB content in the pigment is required. The process according to the invention is therefore a very effective and environmentally very safe process for preparing low-PCB monoazo pigments.

The pigments according to the invention can be used with advantage as colorants in natural and synthetic materials. In particular, they are suitable for pigmenting printing inks for letterpress/offset printing, intaglio printing, flexographic printing and other specific printing processes, for preparing pigmented coating systems based on oxidatively drying or oven-drying systems, for preparing emulsion paints, for pigmenting plastics, for example polyvinyl chloride, polyolefins, polystyrenes and the copolymers thereof, polymethyl methacrylates, polyurethanes, polycarbonates, polyesters, cellulose derivatives, elastomers or thermosets, and also as colorants for spin dyeing. The pigments according to the invention can also be used for specific fields of application, for example as colorants for electrophotographic toners, for ink jet printing processes or for thermotransfer ribbons. The low PCB content of pigments prepared according to the invention further permits the use thereof in the coloring of cosmetic articles.

In the examples that follow, parts and percentages are by weight, unless otherwise stated. Parts by volume bear the same relation to parts by weight as the liter to the kilogram.

EXAMPLES 1) 16.3 parts of 2,5-dichloroaniline are stirred in 37 parts by volume of 30% strength hydrochloric acid for about 8 hours, until hydrochloride formation is complete. After ice has been added, a diazotization is carried out at −5° to 0° C. by adding 14 parts by volume of 38% strength sodium nitrite solution. After stirring for one hour the mixture is diluted with water to 400 parts by volume, excess nitrite is destroyed with sulfamic acid, kieselguhr is added as a filter aid, and the diazonium salt solution is filtered.

In the second vessel, 28.8 parts of 2-hydroxy-3-N-(4-methylphenyl) naphthamide are suspended in 200 parts of water and dissolved at 80° to 90° C. by adding 18 parts by volume of 33% strength sodium hydroxide solution. The clarified alkaline solution is introduced initially into a coupling vessel and cooled down to 10° C., 0.5 part of a tallow fat N-trimethylenediamine-N'-propylamine is added, and the coupling component is precipitated in a finely divided form by adding 14 parts by volume of glacial acetic acid. The suspension of the coupling component is heated to 30° C., and the diazonium salt solution is added dropwise in the course of 2 to 3 hours. The pH, which in the course of the coupling reaction drops from 5.5 to 4, is maintained within the pH range mentioned by adding calcium carbonate a little at a time. Throughout the entire coupling range, spot tests with H-acid show that no diazonium ions are present in the reaction mixture. After all the diazonium salt has been added, the suspension is stirred at 30° C. for 30 minutes and then briefly heated at 98° C., and the pigment is filtered off, washed until salt-free and dried at 60° C. A sample of the coupling product thus obtained (C.I. Pigment Red 10) is doped with a standard solution of two known chlorinated biphenyls, dissolved in about 96% sulfuric acid and the solution obtained is mixed in the combined extraction/purification process described hereinafter with sufficient silica gel for the latter to remain flowable. This mixture is transferred onto a chromatography tube which has previously been charged with two silica gel purification zones (a KOH charged silica gel layer on top of an oleum-charged silica gel zone), and is subsequently eluted with n-hexane. In the eluate, the chlorinated biphenyls are quantitatively determined by gas chromatography following separation over a capillary column by electron capture detection (ECD) or mass-selective detection by comparison against an internal PCB standard. The amount of PCB found is 20 µg, based on 1 g (20 ppm of PCB). Quantification can also be effected by other analytical methods, for example by high pressure liquid chromatography (HPLC).

2) Comparison example: If the monoazo pigment mentioned in Example 1 is prepared at a coupling temperature of 78° C. by the method of operation described in BIOS report 1661, page 127, the product obtained has an analyzed PCB content of 50 to 60 µg/g (50 to 60 ppm).

3) 16.3 parts of 2,5-dichloroaniline are diazotized by the method of Example 1 and, after the destruction of excess nitrite and clarification, 5 parts by volume of glacial acetic acid are added to the resulting diazonium salt solution as a buffer. In another reaction vessel, an alkaline solution of the coupling component is prepared by adding 27 parts of 2-hydroxy-3-naphthanilide to a 60° C. hot solution of 9 parts of sodium hydroxide in 200 parts of water. The diazonium salt solution and the solution of the coupling component are adjusted to identical volumes and metered into a static or dynamic mixer in which turbulent flow conditions prevail at such a rate that an H-acid spot test on the suspension of the coupling product leaving the mixer shows no diazonium salt or only a barely just detectable amount of diazonium salt to be present. The temperature in the mixer is 35° to 45° C., and the pH is 4.5.±0.3. The C.I. Pigment Red 2 is isolated in a conventional manner after coupling has a PCB content of 12 to 21 µg/g.

4) Comparison example: A solution of diazotized 2,5-dichloroaniline prepared as described in Example 3 is metered in the course of an hour underneath the surface of an alkaline solution (pH>12) of 2-hydroxy-3-naphthanilide prepared as described in Example 3. After the addition is complete, the suspension is heated up, and the pigment is filtered off, washed and dried. The pigment thus obtained has a PCB content of more than 200 µg/g.

5) Comparison examples: If the C.I. Pigment Red 2 mentioned in Example 3 is prepared by the method of BIOS report 1661, page 129, by adding an alkaline solution of 2-hydroxy-3-naphthanilide underneath the surface of an acidic diazonium salt solution, and the pH rises to above 8 in the course of the coupling, the result obtained is a pigment having a PCB content of more than 50 µg/g. If the azo coupling is carried out by adding the diazonium salt solution to the alkaline solution (pH>11) of a coupling component, the result obtained is a pigment having a PCB content of more than 100 µg/g.

6) 16.3 parts of 2,5-dichloroaniline are diazotized as described in Example 1. In a second vessel, 30.5 parts of 2-hydroxy-3-N-(2-methoxyphenyl)naphthamide are dissolved in a 60° C. mixture of 18 parts by volume of 33% strength sodium hydroxide solution and 200 parts of water. The clarified alkaline solution of the coupling component is diluted with water to twice the volume, cooled down with ice to 5° to 10° C. and, after addition of 2 parts of the sodium salt of alkylsulfonic acid, precipitated with intensive stirring by adding 14 parts by volume of glacial acetic acid. 4 parts of calcium carbonate are added to the suspension of the coupling component, and the nitrite-free, clarified diazonium salt solution is added at 30° C. to the coupling mixture in the course of 2 hours within the pH range from 5.5 to 3.6, and it is if at all only toward the end of the addition, i.e. within the pH range of <4, that a spot test with H-acid indicates the presence of 2 to 3 mol-% of diazonium salt, based on the total number of moles of coupling component used. Stirring is continued at 30° C. for a further hour, during which any temporarily detectable diazonium salt concentration disappears, and the coupling product is filtered off, washed until salt-free and dried. The C.I. Pigment Red 9 obtained has a PCB content of less than 10 µg/g.

7) If the diazonium salt solution of 2,5-dichloroaniline is reacted under the same reaction conditions as described in Example 6 with a suspension prepared from 31.8 parts of 2-hydroxy-3-N-(2-ethoxyphenyl)-naphthamide, the result is again a coupling product (C.I. Pigment Orange 22) having a PCB content of less than 20 µg/g.

8) Comparison example: The synthesis of C.I. Pigment Red 9 by the method of BIOS report 1661, page 128, although in comparison with Example 6 the addition of the diazonium salt solution to the weakly alkaline suspension of the coupling component takes place at a pH of 8 to 8.5, gives a coupling product having a PCB content of more than 100 µg/g of pigment.

9) 16.3 parts of 2,5-dichloroaniline are diazotized as described in Example 1, any excess nitrite present is destroyed, and the solution is clarified. In a coupling vessel, a solution is prepared at 70° C. of 33.5 parts of 2-hydroxy-3-N-(2,5-dimethoxyphenyl)-naphthamide in a mixture of 200 parts of water, 0.5 part of alkylsulfonate and 18 parts by volume of 33% strength sodium hydroxide solution. The solution thus obtained is cooled down to 10° C., and the coupling component is precipitated with further stirring by rapid addition of 14 parts by volume of glacial acetic acid containing 2 parts of dimethyldiallylammonium chloride in solution. Coupling is effected at 30° to 40° C. by the addition of the diazonium salt solution in the course of 2 hours, while the pH of the reaction mixture is maintained at 4 to 4.5 by the occasional addition of chalk powder. The excess diazonium salt appearing toward the end of the addition in an amount of about 0.01 to 0.02 mol-%, based on the total of pigment and still unconverted coupling component, disappears in the course of the one hour of subsequent stirring. On isolation in a conventional manner, the C.I. Pigment Brown 1 has an analytically determined polychlorinated biphenyl content of 15 µg per gram of pigment.

10) 16.2 parts of 2,5-dichloroaniline are diazotized analogously to Example 1 and the clarified diazonium salt solution, which is free of nitrite ions, is adjusted to a temperature of 5° C. and with water to a volume of 400 parts by volume. In a second vessel, 33 parts of 5-(2-hydroxy-3-naphthoylamino)-benzimidazol-2-one are suspended in 300 parts of water and dissolved by adding 23 parts by volume of 33% strength sodium hydroxide solution. The alkaline solution is clarified and diluted with water to 400 parts by volume. For azo coupling, the two prepared solutions are metered simultaneously in the course of an hour into a static mixer, while the suspension leaving the mixer is recycled back into the mixer by rapid pumping in circulation via a comparatively large stock reservoir vessel. The coupling suspension is maintained at a temperature of 8° to 10° C. during the pumped circulation; the pH is within the range from 5.1 to 5.8. During the metered addition of the solutions of the two reactants it will, if at all, only be toward the end of the addition that the stock reservoir vessel will contain a detectable level of diazonium salt amounting to about 0.02 mol-%, based on the total number of moles of coupling product. This temporary excess disappears rapidly in the course of one hour of subsequent stirring, which is effected at 30° to 40° C. without further pumped circulation. The temperature is then raised to 95° C. and maintained at that level for one hour, and the pigment is filtered off and washed salt-free with water. A sample of the coupling product thus obtained is dried and analyzed; the PCB content is found to be 20 µg/g. The remaining moist pigment press cake is subjected to a thermal aftertreatment at 140° C. for one to two hours as an 8% strength aqueous suspension for conversion into a tinctorially strong and soft-textured pigmentary form. Filtration and drying leaves a C.I. Pigment Brown 10 having a PCB content of 19 µg/g.

11) Comparison example: A nitrite-free diazonium salt solution of 2,5-dichloroaniline obtained as described in Example 1 is brought to a pH between 4.5 and 4.2 by adding a buffer mixture of 36 parts by volume of 33% strength sodium hydroxide solution and 29 parts by volume of glacial acetic acid in 200 parts of water. After one part of the reaction product of stearyl alcohol with 25 mole equivalents of ethylene oxide has been added, an alkaline solution of 5-(2-hydroxy-3-naphthoylamino)-benzimidazol-2-one, prepared as described in Example 10, is added at 5° to 10° C. in the course of 2 hours, during which the pH gradually rises from 5.2 to 5.6. The constant diazonium salt excess present in the course of the coupling disappears about 30 minutes after the addition of the coupling component has ended. The temperature is then raised to 95° C. and maintained at that level for one hour, and the product is filtered off, washed with water until salt-free and dried. The pigment obtained by this process has a PCB content of 150 to 200 µg/g.

12) Comparison example: The procedure of Example 2 of German Patent Specification No. 1,217,008 (cf. U.S. Pat. No. 3,124,565 to Schilling et al, issued Mar. 10, 1964, based on the main patent to which German Patent 1,217,008 is a patent of addition) is followed to prepare C.I. Pigment Brown 10. Accordingly, the acid diazonium salt solution is added simultaneously with the strongly alkaline solution of the coupling component to an acetic acid/sodium acetate buffer mixture previously introduced into the coupling vessel. In the course of coupling, the pH of the reaction mixture rises from about 5 to 11 to 12. The pigment isolated on acidification after the coupling has ended has a PCB content of distinctly more than 500 µg/g.

13) 16.2 parts of 2,5-dichloroaniline are diazotized and prepared for coupling, the process being carried out as described in Example 1. In a second vessel, 25 parts of 5-acetoacetylaminobenzimidazol-2-one are suspended in 200 parts of water and dissolved at 20° C. by adding 20 parts by volume of 33% strength sodium hydroxide solution. The solution is cooled down to 10° C. and added with stirring to an ice-cold mixture of 15 parts by volume of glacial acetic acid, 2 parts of N,N-dimethyl-N,N-diallyammonium chloride in 200 parts of water to give a finely divided suspension of the coupling component. To this suspension is added the prepared nitrite-free diazonium salt solution in such a way that a spot test with H-acid shows no detectable level of diazonium salt in the coupling vessel; that is, that less than 0.01 mol-% of diazonium salt is present, based on the total amount of coupling component present in the coupling vessel and pigment previously formed. During the addition the pH is within the range from 5.5 to 4.5. After the coupling has ended, the suspension is heated to 95° C., and the pigment is filtered off with suction and washed with water until salt-free. A dried sample of the pigment contains 15 µg/g.

14) Comparison example: The monoazo pigment of Example 13 is prepared by the method of German Patent Specification No. 2,347,532 (U.S. Pat. No. 4,195,020 to Hunger et al, issued Mar. 25, 1980), Example 1, by coupling by addition the alkaline solution of the coupling component to the previously introduced diazonium salt solution with simultaneous addition of a sodium acetate solution, so that the pH is maintained at pH 5 during the coupling. The pigment obtained by this coupling variant has a PCB content of 38 µg/g.

15) 32.6 parts of 2,4-dichloroaniline are dissolved at 30° C. in a mixture of 200 parts by volume of water and 60 parts by volume of 30% strength hydrochloric acid and, after cooling down to 0° C., diazotized by rapid addition of 27 parts by volume of 40% strength sodium nitrite solution. After the batch has been stirred at 10° C. for one hour it is clarified and any excess nitrite is destroyed with sulfamic acid. The diazonium salt solution thus obtained is metered in at 40° C. and at a pH of 5.5 to 4.5 to a suspension of 60 parts of 2-hydroxy-3-N-(2-methylphenyl)-naphthamide, prepared as described in Example 16, in the presence of 1 part of a sulfosuccinic ester of an ethoxylated nonylphenol novolak, the rate of addition being controlled in such a way that a spot test with H-acid detects no or only a very small diazo excess corresponding to 0.01 to 0.02 mol-%, based on the total number of moles of coupling component present in the coupling vessel and the pigment already formed. After about three hours the coupling has ended, and the red pigment obtained is filtered off with suction,

I claim:

1. A monoazo pigment of the formula

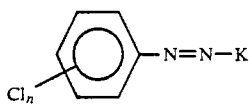

[(I)]

where K is the residue of the coupling component H-K which remains after azo coupling of the coupling component with a diazo component derived from a di- or trichloroaniline, H-K being substituted or unsubstituted naphthol or substituted or unsubstituted acetoacetarylamide, and n is 2 or 3, which pigment contains not more than 25 μg of a PCB, i.e. a polychlorinated biphenyl having at least 4 chlorine atoms, per g of pigment, determined by first dissolving the pigment in concentrated sulfuric acid, then transferring the PCB portions dissolved therein into an apolar organic solvent, and quantitatively analyzing therein for PCB.

2. A monoazo pigment as claimed in claim 1, wherein the diazo component of the monoazo pigment is 2,3-dichloroaniline, 2,4-dichloroaniline, 2,5-dichloroaniline, 2,6-dichloroaniline, 3,4-dichloroaniline or 3,5-dichloroaniline.

3. A monoazo pigment as claimed in claim 1, wherein the diazo component of the monoazo pigment is 2,4-dichloroaniline or 2,5,-dichloroaniline.

4. A monoazo pigment as claimed in claim 1, wherein K is derived from the coupling component H-K, H-K being acetoacetanilide which is substituted on the phenyl ring thereof by 1 to 3 radicals selected from the group consisting of methyl, methoxy, ethoxy, nitro and chlorine, acetoacetanilide which has a 5- or 6-membered heterocycle fused onto the phenyl ring thereof, naphthol, 2-hydroxy-3-naphthoic acid or a 2-hydroxy-3-N-arylnaphthamide.

5. A monoazo pigment as claimed in claim 2, wherein K is derived from the coupling component H-K, H-K being acetoacetanilide which is substituted on the phenyl ring thereof by 1 to 3 radicals selected from the group consisting of methyl, methoxy, ethoxy, nitro and chlorine, acetoacetanilide which has a 5- or 6-membered heterocycle fused onto the phenyl ring thereof, naphthol, 2-hydroxy-3-naphthoic acid or a 2-hydroxy-3-N-arylnaphthamide.

6. A monoazo pigment as claimed in claim 1, wherein the coupling component is a 2-hydroxy-3-naphthanilide or a 2-hydroxy-3-naphthanilide substituted on a phenyl ring thereof by one or more of the radicals methyl, methoxy, ethoxy, nitro, alkanoylamino, aroylamino and chlorine or a 2-hydroxy-3-naphthanilide having a 5- or 6-membered heterocycle fused onto the phenyl ring thereof.

7. A monoazo pigment as claimed in claim 2, wherein the coupling component is a 2-hydroxy-3-naphthanilide or a 2-hydroxy-3-naphthanilide substituted on a phenyl ring thereof by one or more of the radicals methyl, methoxy, ethoxy, nitro, alkanoylamino, aroylamino and chlorine or a 2-hydroxy-3-naphthanilide having a 5- or 6-membered heterocycle fused onto the phenyl ring thereof.

8. A process for preparing the monoazo pigment of the formula as claimed in claim 1 by azo coupling a dichlorobenzene diazonium salt or a mixture of a plurality of such diazonium salts with at least one CH-acidic coupling component H-K, said coupling component H-K being an unsubstituted or substituted acetoacetarylamide or an unsubstituted or substituted naphthol, in an aqueous medium, wherein a) azo coupling is effected by adding the diazonium salt solution to a suspension or solution of the coupling component or by simultaneously metering the aqueous suspensions or solutions of the diazonium salt and of the coupling component into the reaction mixture, b) azo coupling is effected at a pH or within a pH range of less than pH 7 and b1) between pH 4 and 7 during and after azo coupling less than 0.05 mol-%, b2) at pH 2 to 4 during azo coupling less than 5 mol-%, and b3) at pH<2 during azo coupling less than 25 mol-% of diazonium salt is detectable in the reaction mixture and in pH ranges b2) and b3) more than 0.05 mol-% of diazonium salt is not present for longer than a total of 8 hours, more than 5 mol-% diazonium salt is not present for longer than a total of 4 hours and more than 15 mol-% of diazonium salt is not present for longer than a total of 2 hours, the mol-%ages of diazonium salt each being based on the total number of moles of coupling component present in the reaction mixture and pigment already formed, c) azo coupling is effected at a temperature or temperatures of 0° to 50° C., d) azo coupling is effected in the absence of nitrite ions, and e) azo coupling is carried out in the absence or presence of ionic surfactants or coupling accelerants.

9. The process as claimed in claim 8, wherein an azo coupling is subject to at least one of the conditions b1), b2) and b3) and b1) between pH 4 and 7 during and after the azo coupling less than 0.02 mol-%, b2) at pH 2 to 4 during the azo coupling less than 0.05 mol-% and b3) at pH<2 during the azo coupling less than 5 mol-% of diazonium salt is detectable in the reaction mixture.

10. The process as claimed in claim 8, wherein the azo coupling is carried out at a temperature of 20° to 40° C.

11. The process as claimed in claim 9, wherein the azo coupling is carried out at a temperature of 20° to 40° C.

12. The process as claimed in claims 8, wherein the azo coupling is carried out in the presence of anionic or cationic surfactants.

13. A monoazo pigment prepared by the process of claim 8.

14. A monoazo pigment as claimed in claim 13 containing not more than 25 μg of any polychlorinated biphenyl having at least 4 chlorine atoms per biphenyl nucleus, per gram of pigment, which has not been subjected to additional purification for the removal of said polychlorinated biphenyl and has not been subjected to any purification technique causing any damage to, or having any undesirable effect on the physical or coloristic properties of, said monoazo pigment and which is substantially free of any said polychlorinated biphenyl which has been modified in chemical structure through dehalogenation or oxidative degradation or degradation with thermal, photolytic, or electrical energy.

15. A method for coloring a natural or synthetic material comprising the step of coloring said material with a monoazo pigment as claimed in claim 1 by introducing said monoazo pigment into said material.

16. A colored natural or synthetic material comprising
a printing ink, an oxidatively-dryable or oven-dryable coating composition, an emulsion paint, a plastic, a spun-dyed material, an electrophotographic toner, a thermo-transfer ribbon or a cosmetic article, and as the coloring agent for said natural or synthetic material, a monoazo pigment as claimed in claim 1.

* * * * *